(12) United States Patent
Hashimoto (10) Patent No.: US 9,242,560 B2
(45) Date of Patent: Jan. 26, 2016

(54) ELECTRIC VEHICLE

(71) Applicant: Hironobu Hashimoto, Toyota (JP)

(72) Inventor: Hironobu Hashimoto, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 612 days.

(21) Appl. No.: 13/626,530

(22) Filed: Sep. 25, 2012

(65) Prior Publication Data

US 2013/0076126 A1    Mar. 28, 2013

(30) Foreign Application Priority Data

Sep. 26, 2011   (JP) .................... 2011-209865

(51) Int. Cl.
| | | |
|---|---|---|
| *B60R 16/03* | (2006.01) | |
| *B60L 1/00* | (2006.01) | |
| *B60L 3/00* | (2006.01) | |
| *B60L 11/12* | (2006.01) | |

(Continued)

(52) U.S. Cl.
CPC ............... *B60L 1/003* (2013.01); *B60L 3/003* (2013.01); *B60L 3/0061* (2013.01); *B60L 11/123* (2013.01); *B60L 11/14* (2013.01); *B60L 11/1881* (2013.01); *B60L 15/2036* (2013.01); *B60L 2210/40* (2013.01); *B60L 2220/42* (2013.01); *B60L 2240/12* (2013.01); *B60L 2240/36* (2013.01); *B60L 2240/421* (2013.01); *B60L 2240/425* (2013.01); *B60L 2240/441* (2013.01); *B60L 2240/525* (2013.01); *B60L 2250/12* (2013.01); *Y02T 10/6217* (2013.01); *Y02T 10/648* (2013.01); *Y02T 10/7005* (2013.01); *Y02T 10/7077* (2013.01); *Y02T 10/7241* (2013.01); *Y02T 10/7275* (2013.01); *Y02T 90/34* (2013.01)

(58) Field of Classification Search
CPC ....... B60L 1/003; B60L 3/0061; B60L 3/003; B60L 11/123; B60L 11/14; B60L 11/1881; B60L 15/2036; B60L 2210/40
USPC ....................................... 307/9.1; 180/65.245
See application file for complete search history.

(56) References Cited

U.S. PATENT DOCUMENTS

| | | | | |
|---|---|---|---|---|
| 6,828,742 B2* | 12/2004 | Suzuki | ................... | B60K 6/485 |
| | | | | 180/65.26 |
| 7,438,146 B2* | 10/2008 | Hirakata | ........... | H01M 8/04007 |
| | | | | 180/65.1 |

(Continued)

FOREIGN PATENT DOCUMENTS

| | | |
|---|---|---|
| JP | 08-188044 A | 7/1996 |
| JP | 10-238345 A | 9/1998 |

(Continued)

*Primary Examiner* — Brodie Follman
*Assistant Examiner* — Brian Cassidy
(74) *Attorney, Agent, or Firm* — Dinsmore & Shohl LLP (57) ABSTRACT

An electric vehicle includes: an electric motor; an inverter that supplies electric power to the electric motor; and a cooling system that cools at least one of the electric motor and the inverter, the cooling system having: a main coolant passage configured to circulate a coolant through a radiator and at least one of the electric motor and the inverter; a bypass coolant passage, connected to the main coolant passage, that bypasses at least one of the electric motor and the inverter; and a controller configured to switch from the main coolant passage to the bypass coolant passage when a main switch of the vehicle provided at a driver's seat is turned off while the electric vehicle is travelling, and to switch from the bypass coolant passage to the main coolant passage when the main switch is then turned on.

6 Claims, 5 Drawing Sheets

(51) Int. Cl.
*B60L 11/14* (2006.01)
*B60L 11/18* (2006.01)
*B60L 15/20* (2006.01)

(56) References Cited

U.S. PATENT DOCUMENTS

| | | | |
|---|---|---|---|
| 8,459,389 B2 * | 6/2013 | Myers | B60L 11/14 123/41.08 |
| 8,708,071 B2 * | 4/2014 | Yokoyama | B60L 1/003 165/104.33 |
| 2005/0210900 A1 * | 9/2005 | Oomura et al. | 62/228.1 |
| 2009/0236160 A1 * | 9/2009 | Tanaka et al. | 180/65.265 |
| 2010/0191416 A1 * | 7/2010 | Yamaguchi et al. | 701/36 |
| 2011/0106358 A1 | 5/2011 | Sawada et al. | |
| 2014/0356666 A1 * | 12/2014 | Murata | B60L 1/003 429/83 |

FOREIGN PATENT DOCUMENTS

| | | |
|---|---|---|
| JP | 10-257604 A | 9/1998 |
| JP | 2007-216818 A | 8/2007 |
| JP | 2007-216833 A | 8/2007 |
| JP | 2007-267494 A | 10/2007 |
| JP | 2009-248860 A | 10/2009 |
| JP | 2011-093424 A | 5/2011 |

* cited by examiner

| VEHICLE SPEED [km/h] | NORMAL MODE | EMERGENCY MODE |
|---|---|---|
| UP TO 10 | Mid | Hi |
| UP TO 20 | Lo | Mid |
| UP TO 30 | STOPPED | Lo |
| FROM 30 | STOPPED | STOPPED |

ELECTRIC VEHICLE

BACKGROUND OF THE INVENTION

1. Field of the Invention

The invention relates to an electric vehicle, such as a pure electric vehicle, a hybrid vehicle or a fuel cell vehicle, that has an electric motor for driving wheels.

2. Description of Related Art

Electric vehicles, unlike common engine vehicles, are equipped with an electric system that handles large current and that includes, for example, an electric motor for driving wheels, a high-capacity and high-voltage battery, an inverter that converts direct-current power from the battery into alternating-current power that is suitable to drive the electric motor, etc. Therefore, the electric vehicles are provided with various safety measures for the electric system and measures against defects in the system, which are not provided for the engine vehicles.

For example, Japanese Patent Application Publication No. 2007-216833 (JP 2007-216833 A) discloses a technology that prevents an event in conjunction with a hybrid vehicle in which while the hybrid vehicle is traveling, an engine stop signal is input to a control device, and the engine is forced to stop, so that large current flows via the electric motor and the amount of discharge from the main battery exceeds the upper limit, and as a result, the service life of the battery shortens.

SUMMARY OF THE INVENTION

The invention provides an electric vehicle equipped with a measure against an event peculiar to electric vehicles, that is, rapid production of heat from an inverter (and/or an electric motor) that occurs when a main switch of the vehicle is turned off and on while the vehicle is traveling.

An electric vehicle in accordance with an aspect of the invention includes: an electric motor for driving a wheel (an electric motor that rotates in association with an axle shaft); an inverter that supplies electric power to the electric motor; and a cooling system that cools at least one of the electric motor and the inverter. The cooling system includes a main coolant passage, a bypass coolant passage and a controller. The main coolant passage is configured to circulate a coolant through a radiator and at least one of the electric motor and the inverter. The bypass coolant passage is connected to the main coolant passage and bypasses at least one of the electric motor and the inverter. The controller is configured to switch from the main coolant passage to the bypass coolant passage when a main switch of the vehicle that is provided at a driver's seat is switched from an on-state to an off-state while the electric vehicle is traveling, and switch from the bypass coolant passage to the main coolant passage when the main switch is switched back to the on-state. According to the foregoing construction, when the main switch is switched off and on while the vehicle is traveling, the temperature of the coolant is sufficiently low. Therefore, if subsequently the inverter or the electric motor rapidly produces heat, the temperature rise thereof can be restrained.

The invention has been made as a result of consideration about measures for a certain situation peculiar to electric vehicles, that is, a situation where a driver erroneously switches the main switch of the vehicle to the off-state or switches it back to the on-state while the vehicle is traveling. The main switch of the vehicle herein means a switch that is generally called "ignition switch" and that is provided at the driver's seat. In the related-art electric vehicles, when the main switch is at the on-position, the relay that connects the inverter and the main battery is closed (i.e., the electric system and the main battery are connected), so that a state in which the electric motor is operating or is able to operate is brought about. When the main switch is at the off-position, the relay between the inverter and the main battery is opened, and therefore the supply of electric power to the electric motor stops. In the case of a hybrid vehicle equipped with an electric motor and an engine, when the main switch is at the on-position, the relay that connects the inverter and the main battery is closed (i.e., the electric system and the main battery are connected), so that a state in which the electric motor is operating or is able to operate is brought about and also a state in which the engine is operating or is able to operate is brought about. When the main switch is at the off-position, the supply of electric power to the electric motor stops and the supply of fuel to the engine also stops. Furthermore, in the related-art electric vehicles (including hybrid vehicles), when the vehicle main switch is switched to the off-state, the system related to the vehicle drive system also stops. The system related to the vehicle drive system typically includes an inverter, and a cooling system for the inverter or for an electric motor. Hereinafter, to simplify description, the main switch of the vehicle being switched from the on-state to the off-state is termed "(being) switched on and off", and the main switch being switched from the off state to the on-state is termed "(being) switched off and on".

Although the main switch being switched off and on during travel of the vehicle is not a usual manner of use, a driver can erroneously perform such an operation. When the main switch is switched from the on-state to the off-state while the vehicle is travelling, the supply of electric power to the electric motor stops as well as the inverter and the cooling system, but the electric motor continues rotating due to the inertia of the vehicle. If the main switch is switched back from the off-state to on-state while the vehicle is travelling, the inverter and the cooling system are started while the electric motor is rotating. Therefore, immediately after the main switch is switched back from the off-state to the on-state, high load acts on the inverter and the cooling system. For example, if the inverter is started while the electric motor is rotating due to the coasting of the vehicle, the function of recovering regenerative electric power is activated so that the inverter performs an operation of converting the counter electromotive force produced by the electric motor into direct-current power. Immediately after the main switch is switched back from the off-state to the on-state, high load acts on the inverter, and the inverter produces heat. Furthermore, while the main switch is in the off-state, the main relay that connects the inverter and the battery is open, and therefore the motor's winding assumes an open system with no current flowing (no counter electromotive force produced). However, when the main relay is closed, the motor's winding becomes a closed system, so that counter electromotive force occurs. Then, the electric motor itself produces heat. Furthermore, although detailed later, in the case of a specific hybrid vehicle, if the main switch is switched off and on while the vehicle is travelling, high output of the electric motor is demanded, so that the electric motor (and the inverter that controls the electric motor) produces heat. However, when the main switch is switched back from the off-state to the on-state while the hybrid vehicle is traveling, the cooling system for the inverter (and/or the electric motor) is just started at that time, and therefore there is a time lag in coping with the rapid heat production from the inverter (and/or the electric motor).

Whereas in the related art, the cooling system is stopped in the case where the main switch of the electric vehicle is switched from the on-state to the off-state while the vehicle is traveling, the electric vehicle of the invention does not stop the cooling system in that case. Furthermore in the electric vehicle of the invention, the coolant is actively cooled in preparation for the subsequent switching of the main switch back from the off-state to the on-state. An electric vehicle in accordance with the aspect of the invention includes a main coolant passage that circulates a coolant through a radiator and at least one of an electric motor and an inverter, and a bypass coolant passage that bypasses the electric motor and/or the inverter, wherein if the main switch is switched from the on-state to the off-state while the vehicle is traveling, the bypass coolant passage is selected, or made effective, so that the coolant does not flow via the electric motor and/or the inverter. When the main switch is switched to the off-state, the electric motor and the inverter stop and, after that, does not produce heat, so that the temperature rise thereof is small without a need for active cooling. Therefore, in preparation for the later switching of the main switch back from the off-state to the on-state, the coolant is sent to the radiator bypassing the electric motor and/or the inverter to actively lower the temperature of the coolant. In this manner, it is possible to make a preparation for the rapid heat production from the inverter or the electric motor when the main switch is switched back from the off-state to the on-state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
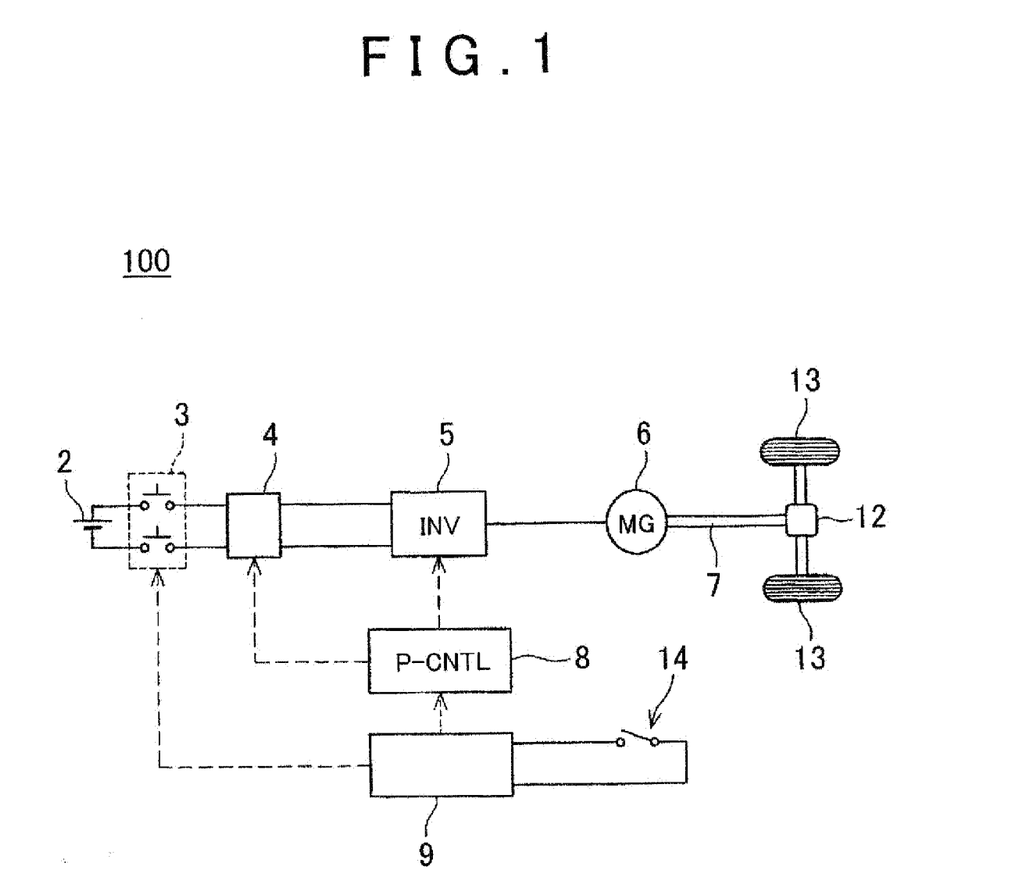
FIG. 1 is a block diagram of a drive system of an electric vehicle in accordance with a first embodiment of the invention.

FIG. 1 shows a block diagram of a drive system of an electric vehicle 100 in accordance with a first embodiment of the invention. The electric vehicle 100 is a one-electric motor electric vehicle that has one electric motor 6 for driving wheels. The electric motor 6 is driven through the use of a battery 2 as an electric power supply. The battery 2 is connected to an inverter 5 via a system main relay 3 and a voltage boost converter 4. The system main relay 3 is a switch for connecting the battery 2 to a drive system (representatively, the inverter 5 and the electric motor 6) of the electric vehicle 100 and disconnecting the battery 2 from the drive system. The system main relay 3 is controlled by a general controller 9 that comprehensively controls the entire electric system of the electric vehicle 100. Typically, the general controller 9 closes the system main relay 3 (connects the battery 2 to the vehicle drive system) when a vehicle main switch 14 provided at a driver's seat is switched to an on-position, and the general controller 9 opens the system main relay 3 (disconnects the battery 2 from the vehicle drive system) when the main switch 14 is switched to an off-position. The main switch 14 will be separately described later.

The voltage boost converter 4 is a device that boosts the output voltage of the battery 2 to a voltage that is suitable to drive the electric motor 6. As an example, the voltage boost converter 4 boosts the output voltage of the battery 2 that is 300 [V] to a voltage of 600 [V].

The inverter 5 converts direct-current power of the battery 2 into alternating-current power, and supplies the alternating-current power to the electric motor 6. The inverter 5 is of a PWM driven type, and the PWM signal is supplied from an electric motor controller 8. The electric motor controller 8 receives a target value of the output of the electric motor 6 from the general controller 9, and generates a PWM signal commensurate with the target output, and outputs the PWM signal. Incidentally, the voltage boost converter 4 is also equipped with built-in switching elements, and a drive command for the switching elements is also given by the electric motor controller 8. The general controller 9 determines the target value of the output of the motor 6 from the vehicle speed, the accelerator operation amount, the state of charge (SOC) of the battery 2, etc., and outputs the determined target output value to the motor controller 8.

An output shaft of the electric motor 6 is connected to an axle shaft 7, and is connected to wheels 13 via a differential gear 12. The electric motor 6 rotates in association with the axle shaft. That is, when the accelerator is turned off while the vehicle is travelling, the electric motor 6 is driven from the axle shaft side, due to the inertia of the vehicle. At this time, the counter electromotive force that the electric motor 6 produces is converted into direct-current power via the inverter 5, and is stored in the battery 2. That is, the electric vehicle 100 is capable of regenerating kinetic energy of the vehicle into electric energy and storing the regenerated electric energy.

Next, with reference to FIG. 2, a cooling system 110 of the electric vehicle 100 will be described. The cooling system 110 cools the inverter 5 and the electric motor 6. The cooling system 110 includes a radiator 22, a reserve tank 24, a pump 25, and a main coolant passage 21 that circulates a coolant through the radiator 22, the inverter 5, the electric motor 6 and the reserve tank 24. Incidentally, the main coolant passage 21 extends through the inside of a drive train 26 that houses the electric motor 6. Inside the drive train 26, the electric motor 6 is cooled by the coolant. Provided at intermediate positions of the main coolant passage 21 are a first bypass coolant passage 31a that bypasses the inverter 5, and a second bypass coolant passage 31b that bypasses the electric motor 6. The start point and the end point of each of the bypass coolant passages are provided with three-way valves 32 that change the direction in which the coolant flows. A controller of the cooling system 110 (cooling controller 28) controls the three-way valves 32 so as to switch between the bypass coolant passages and passages that extend via the inverter 5 or the electric motor 6, which are objects to be cooled. The cooling controller 28 determines the power of operation of the pump 25 on the basis of the coolant temperature detected by a temperature sensor 27 during ordinary travel of the vehicle. Besides, the cooling controller 28 determines the power of operation of a radiator fan 23 according to the vehicle speed (this will be detailed later). The radiator fan 23 sends air to the radiator 22 to accelerate the cooling of the coolant. The cooling controller 28, similarly to the electric motor controller 8, obtains information regarding the vehicle speed, etc. from the general controller 9 to control the pump 25 and the radiator fan 23.

The main switch 14 provided at the driver's seat in the vehicle will be described. The main switch 14 is what is called an ignition switch. The main switch 14 is of a rotary type, and is capable of assuming the following four step positions. (1) OFF: a state in which the vehicle system is completely stopped (however, electric power is supplied to devices that need to be electrified all the time, such as a clock, a security system, etc.) (2) ACC-ON (Ready-OFF): what is called an accessory-on state in which electric power is supplied to an audio system, room lamps, an air-conditioner, etc. (however, if the switches of these devices are off, the devices do not operate). Incidentally, in this state, the system main relay 3 that connects the main battery 2 to the inverter 5 remains open, so that the vehicle drive system is not supplied with electric power. (3) Ready-ON: when the main switch 14 is switched to this position, the system main relay 3 is closed (the main battery 2 and the electric system of the vehicle travel drive system are connected). In this state, the inverter 5 is supplied with electric power (however, the electric motor 6 is not supplied with electric power as long as the switching elements in the inverter 5 are not operated). If the accelerator pedal is depressed during this state, the inverter 5 operates so that the electric motor 6 is driven and the vehicle starts to travel. Besides, if the accelerator operation amount becomes zero while the vehicle is travelling, the battery 2 is charged by the counter electromotive force of the electric motor 6.

The main switch 14 of the vehicle can assume the foregoing three positions. In this specification, when the main switch 14 is in the Ready-ON position, it is simply expressed by "the main switch 14 is on", and when the main switch 14 is in the Ready-OFF position or the OFF position, it is collectively expressed by "the main switch 14 is off". When the main switch 14 is switched to the OFF position, the battery 2 is disconnected from the electric system, and the inverter 5 also completely stops functioning. In the related-art electric vehicles, when the main switch 14 is switched to the OFF position, the cooling system also completely stops. That is, the supply of electric power to the pump 25 and the radiator fan 23 is shut down, and the pump 25 and the radiator fan 23 stop.

Although it is made known to drivers that while the vehicle is travelling the main switch 14 should not be turned off, it sometimes happens that a driver erroneously turns off the main switch 14 while the vehicle is travelling. In such a case, the driver, realizing that the main switch 14 has been erroneously turned off, may immediately turn the main switch 14 back to the ON position. That is, it can happen that while the vehicle is travelling, the main switch 14 is switched form the ON position to the OFF position and then back to the ON position. If the main switch 14 is turned off while the vehicle is travelling, all the functions of the vehicle stop according to the related art while the electric motor continues rotating due to the coasting of the vehicle. In particular, the cooling system stops in such a case according to the related-art. If the main switch 14 is turned back to the ON position, the electric motor 6, which has been rotating due to inertia, outputs large regenerative electric power, and this electric power is converted into direct-current power by the inverter 5. Immediately after the main switch 14 is turned to the ON position, the electric motor 6 and the inverter 5 begin to operate and therefore produce heat. On the other hand, since the cooling system has just activated, and there is a time lag in responding to or dealing with the heat production from the electric motor 6 and the inverter 5. A technology disclosed by this specification is to cover the response lag of the cooling system due to switching on/off of the main switch 14 during travel of the vehicle. Hereinafter, a process that the cooling controller 28 executes in cooperation with the electric motor controller 8 and the general controller 9 will be described. Hereinafter, the cooling controller 28, the electric motor controller 8 and the general controller 9 will be collectively referred to as "vehicle controller".

Figure 3:
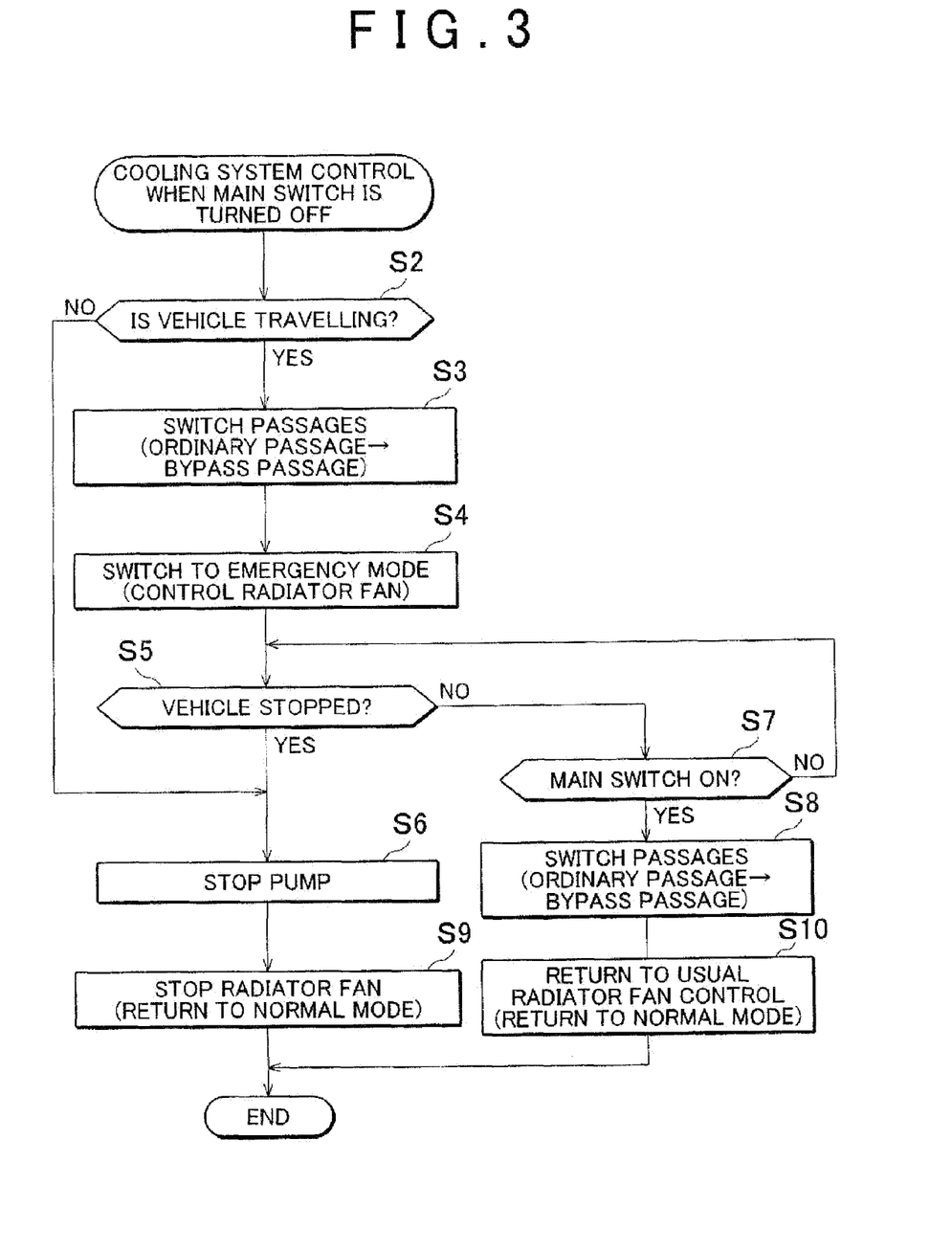
FIG. 3 is a flowchart of control of the cooling system.

FIG. 3 is a flowchart of control of the cooling system performed when the main switch 14 is switched from the ON position to the OFF position. The process shown in FIG. 3 is started when the main switch 14 is turned off. The vehicle controller first checks whether the vehicle is travelling (S2). This check is based on sensor data from the vehicle speed sensor. Incidentally, the vehicle controller may determine that the vehicle is in a stopped state even when the vehicle speed is not exactly zero, that is, for example, when the vehicle speed is less than 5 [km/h]. If the vehicle is in the stopped state (NO in S2), the vehicle controller stops the radiator fan 23 and the pump 25, and ends the process (S6 and S9). If the vehicle is travelling (YES in S2), the vehicle controller switches the main coolant passage from the ordinary passage to the bypass coolant passage (S3). Herein, the "ordinary passage" is the passage that extends via the inverter 5 and the electric motor 6, which are devices to be cooled. In step S3, the cooling controller 28 controls the three-way valves 32 to switch the passage.

Figure 4:
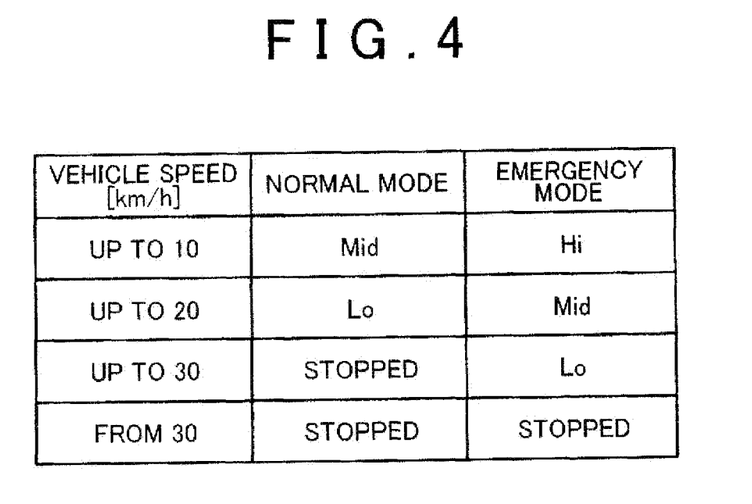
FIG. 4 shows a control map for a radiator fan.

Next, the vehicle controller switches the control of the output of the radiator fan 23 from a normal mode that is used during normal operation to an emergency mode (S4). FIG. 4 shows an example of control modes of the radiator fan. The cooling controller 28 changes the rotation speed (target rotation speed) of the radiator fan 23 according to the vehicle speed. In general, the rotation speed of the radiator fan 23 is reduced as the vehicle speed increases. This is because the higher the vehicle speed is, the higher the cooling effect of air flow becomes. For example, during the "normal mode", the cooling controller 28 drives the radiator fan 23 at a middle speed (Mid) when the vehicle speed is less than or equal to 10 [km/h], and drives the radiator fan 23 at a low speed (Lo) when the vehicle speed is between 10 and 20 [km/h], and stops the radiator fan 23 when the vehicle speed is greater than or equal to 20 [km/h]. On the other hand, during the "emergency mode", the controller 28 drives the radiator fan 23 at a high speed (Hi) when the vehicle speed is less than or equal to 10 [km/h], and drives the radiator fan 23 at the middle speed (Mid) when the vehicle speed is between 10 and 20 [km/h], and drives the radiator fan 23 at the low speed (Lo) when the vehicle speed is between 20 and 30 [km/h], and stops the radiator fan 23 when the vehicle speed is greater than or equal to 30 [km/h]. Herein, as for the rotation speed of the radiator fan 23, the high speed (Hi)>the middle speed (Mid)>the low speed (Lo). As shown in FIG. 4, during the emergency mode, the rotation speed of the radiator fan 23 is set higher than those during the normal mode. The cooling controller 28 controls the radiator fan 23 on the basis of the selected mode. In general, the vehicle controller sets the rotation speed of the radiator fan 23 at a first rotation speed (e.g., the high speed (Hi)) when the vehicle speed is lower than a predetermined threshold value of vehicle speed (e.g., 10 [km/h]), and sets the rotation speed of the radiator fan 23 at a second rotation speed (e.g., the middle speed (Mid)) that is lower than the first rotation speed when the vehicle speed is higher than the threshold value of the vehicle speed (10 [km/h]). Incidentally, the pump 25 that sends out the coolant remains in operation during execution of the control shown in FIG. 3. That is, even when the main switch 14 is turned off, the coolant continues circulating through the bypass coolant passages 31a and 31b.

Referring back to FIG. 3, description of the control of the cooling system will be continued. The passage is switched to the bypass coolant passage (S3), and the control of the radiator fan 23 is switched to the emergency mode (S4). After that, the controller monitors whether the vehicle has stopped (S5). If the vehicle has stopped (YES in S5), the controller stops the pump 25 (S6), and further stops the radiator fan 23 (S9), and thus ends the process. Incidentally, when the radiator fan 23 is stopped, the control mode, which has been switched in step S4, is returned from the emergency mode to the normal mode in preparation for the subsequent switching of the main switch to the ON position.

In the case where after the main switch 14 is switched from the ON position to the OFF position, the main switch 14 is switched again to the ON position while the vehicle is traveling (NO in S5 and YES in S7), the controller sets the passage of the coolant back to the previous passage (in S8, in which the passage is switched from the bypass coolant passage to the passage that extends via the inverter 5 and the electric motor 6), and then the controller returns to the cooling control for the ordinary travel of the vehicle (S10). Incidentally, in step S10, the controller switches the control mode, which was switched in step S4, back from the emergency mode to the normal mode.

Advantages of the above-described control of the cooling system will be described. If the vehicle is travelling when the main switch 14 is switched from the ON position to the OFF position, the passage of the coolant is switched to the bypass coolant passage, so that the coolant continues circulating. The coolant bypasses the inverter 5 and the electric motor 6, which are heat sources, and circulates between the radiator 22 and the reserve tank 24. Since the coolant passes through the radiator 22 without passing through the heat sources, the coolant is actively cooled, so that the temperature declines. When the main switch 14 is switched back to the ON position, the coolant passage is switched from the bypass coolant passage to the previous passage, so that the coolant whose temperature has declined flows to the inverter 5 and the electric motor 6. As described above, if during travel of the vehicle, the main switch 14 is switched from the ON position to the OFF position, and then is switched back to the ON position, the inverter 5 and the electric motor 6 rapidly produce heat; however, since the coolant temperature is very low, the temperature rise of the inverter 5 and the electric motor 6 can be restrained.

Second Embodiment

Figure 5:
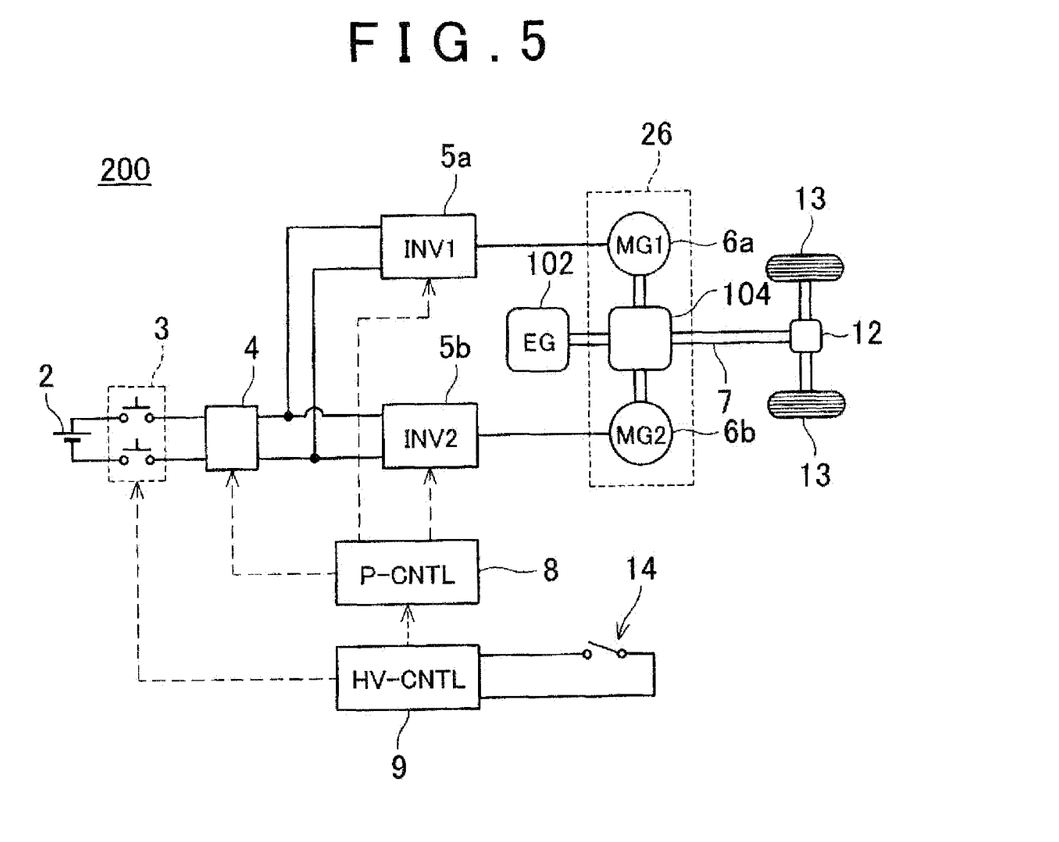
FIG. 5 is a block diagram of an electric vehicle in accordance with a second embodiment of the invention.

A second embodiment of the invention will be described. An electric vehicle in accordance with the second embodiment is a hybrid vehicle 200 that has an engine 102 and two electric motors (a first electric motor 6a and a second electric motor 6b) which are provided for the purpose of driving wheels. A block diagram of a drive system of the hybrid vehicle 200 is shown in FIG. 5. The hybrid vehicle 200 includes a first inverter 5a and a second inverter 5b that are provided for the first electric motor 6a (MG1) and the second electric motor 6b (MG2), respectively. Both the inverters 5a and 5b are supplied with electric power from the battery 2. Furthermore, each of the inverters receives a PWM command from an electric motor controller 8. The output torque of the first electric motor 6a, the output torque of the second electric motor 6b and the output torque of the engine 102 are combined or distributed by a power distribution mechanism 104 before being transmitted to an axle shaft 7. The first electric motor 6a functions mainly as an electricity generator and a self-starter electric motor. The second electric motor 6b is mainly used to produce drive force. However, it is to be noted that if large drive force is needed, the first electric motor 6a is also used to supply drive force, and that at the time of regenerative braking, the second electric motor 6b functions as an electricity generator. A battery 2, a system main relay 3, a voltage boost converter 4, an electric motor controller 8, a general controller 9 and a main switch 14 are substantially the same as those in the first embodiment, and descriptions thereof are omitted. Furthermore, the flow of control of the cooling system is also the same as the flow shown in FIG. 3, and therefore description of the control flow is omitted.

Figure 2:
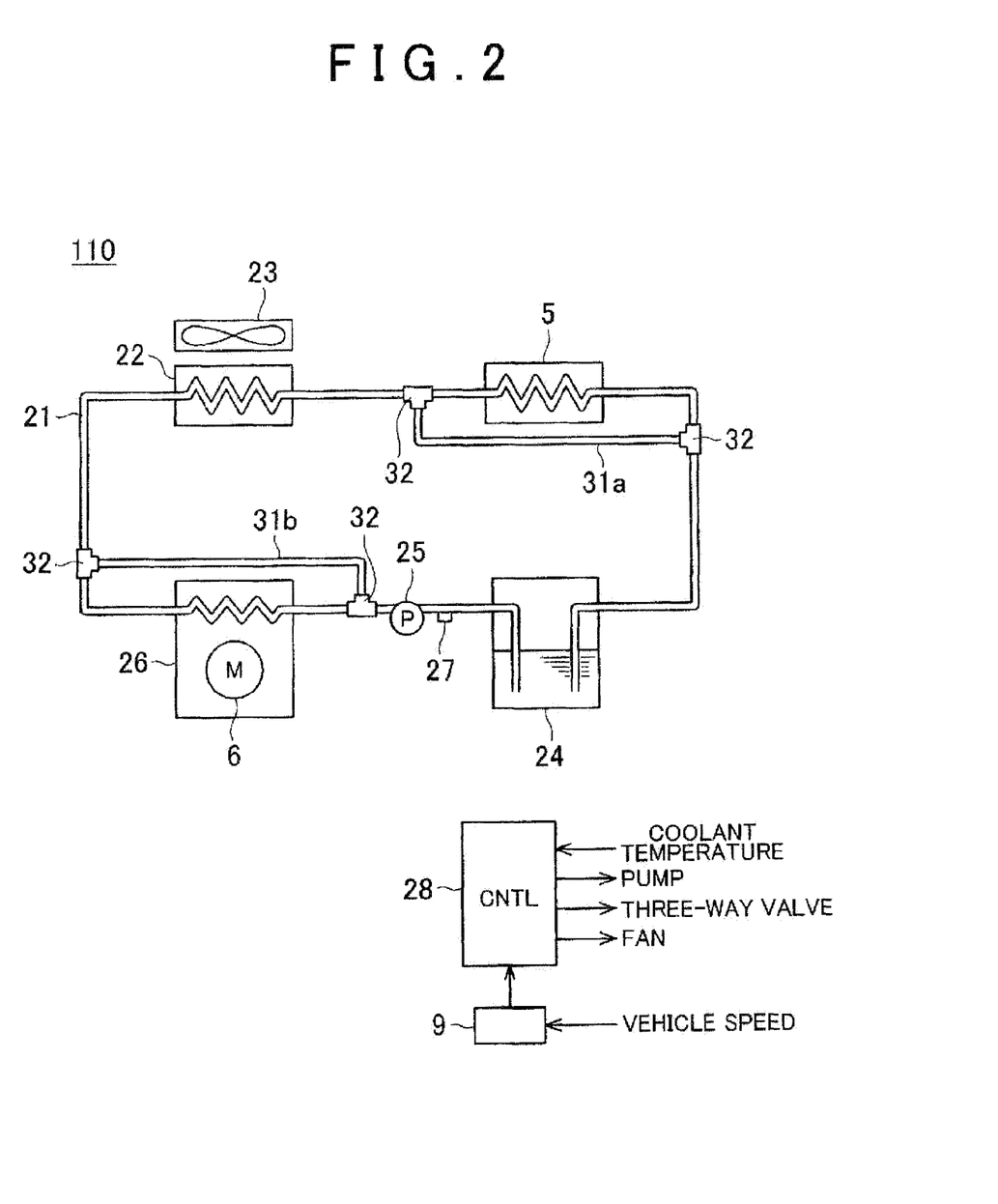
FIG. 2 is a block diagram of a cooling system of the electric vehicle in accordance with the first embodiment.

The cooling system of the hybrid vehicle 200 of the second embodiment is basically the same as the cooling system 110 of the first embodiment shown in FIG. 2. However, regarding the inverter 5 shown in FIG. 2, the second embodiment shown in FIG. 5 includes inverters 5a and 5b. Furthermore, regarding the drive train 26 shown in FIG. 2, in the second embodiment shown in FIG. 5, the first electric motor 6a, the second electric motor 6b and the power distribution mechanism 104 are housed therein. Other constructions of the second embodiment are the same as those of the first embodiment (FIG. 2), and therefore detailed description of the cooling system of the hybrid vehicle 200 is omitted.

Figure 6:
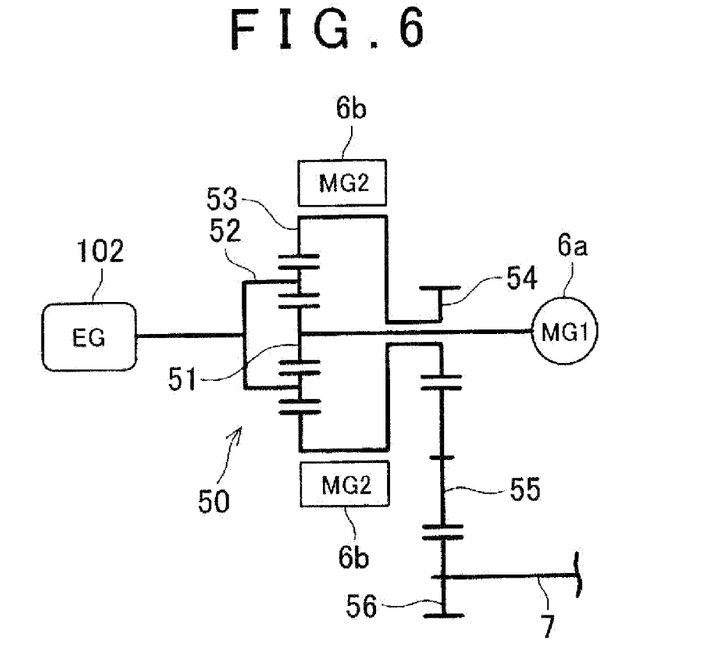
FIG. 6 is a skeleton diagram of a planetary gear that is a component of a motive power distribution mechanism.

The hybrid vehicle 200 of the second embodiment has a feature in the power distribution mechanism 104. The power distribution mechanism 104 is constructed mainly of a planetary gear 50. FIG. 6 shows a skeleton diagram of the planetary gear 50 that is a component of the power distribution mechanism 104. The planetary gear 50 is a gear set in which a sun gear 51, a planetary carrier 52 and a ring gear 53 are combined. The planetary carrier 52 is connected to the output shaft of the engine 102. The sun gear 51 is connected to the output shaft of the first electric motor 6a. The ring gear 53 is connected to the second electric motor 6b. A portion of the ring gear 53 forms a rotor of the second electric motor 6b. Furthermore, the ring gear 53 is connected to an axle shaft 7 via an output gear 54 that is coaxially fixed to the ring gear 53, and via an idle gear 55. Reference numeral 56 in FIG. 6 denotes a transfer gear fixed to the axle shaft 7. The power distribution mechanism 104 constructed as described above determines the output torque of the axle shaft 7 on the basis of the proportions of the outputs of the engine 102, the first electric motor 6a and the second electric motor 6b. The structure and functions of the planetary gear 50 are well known, and therefore detailed description thereof is omitted. As is apparent from FIG. 6, the first electric motor 6a and the second electric motor 6b rotate in association with the wheels. That is, even when the main switch 14 is switched to the OFF position while the hybrid vehicle is travelling, the electric motors continue rotating.

The first electric motor 6a is used as a self-starter motor. That is, during a stopped state of the engine 102 (in which the ring gear 53 is not rotating), the first electric motor 6a is driven so as to turn the engine 102 from the output shaft side, and simultaneously fuel is supplied to the engine 102, so that the engine 102 is started.

Figure 7:
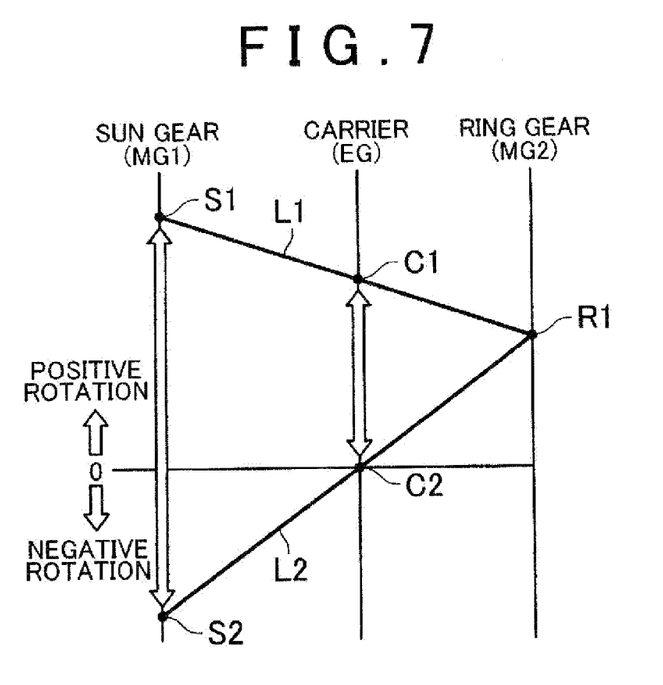
FIG. 7 is an alignment chart of the planetary gear that is a component of the motive power distribution mechanism.

FIG. 7 shows an alignment chart of the planetary gear 50. Graphs L1 and L2 each represent the gear ratios occurring when the vehicle is travelling at a predetermined speed. Specifically, the graph L1 shows the gear ratios occurring when the engine 102 is turning at a rotation speed C1 while the graph L2 shows the gear ratios occurring when the rotation speed of the engine 102 is zero. Since the rotation speed of the ring gear 53 is proportional to the rotation speed of the axle shaft, the rotation speed of the ring gear 53 is R1, regardless of whether the engine 102 is rotating or stopped. When the vehicle is steadily travelling, the engine 102 is being driven, so that the gears assume the rotation speeds shown by the graph L1. At this time, the sun gear 51 connected to the first electric motor 6a has a rotation speed of S1. In this case, the first electric motor 6a is generating electric power.

If during travel of the vehicle, the driver erroneously switches the main switch 14 to the OFF position, the fuel supply to the engine 102 stops and the engine 102 stops. The second electric motor 6b also stops because the supply of electric power to the second electric motor 6b is shut down. However, since the vehicle continues travelling due to inertia, the rotation speed of the ring gear 53 remains R1. As the engine rotation speed declines from C1 to C2 (zero) while the rotation speed of the ring gear 53 remains R1, the rotation speed of the sun gear 51 declines from S1 to S2. That is, the relation in rotation speed among the gears changes from the relation shown by the graph L1 to the one shown by the graph L2. The rotation direction of the sun gear 51 reverses, as is apparent from the alignment chart in FIG. 7.

If during the state of the graph L2, the main switch 14 is switched from the OFF position to the ON position, the controller of the vehicle needs to start the engine 102 and change the state back to the state of the graph L1. Since the first electric motor 6a functions as a self-starter motor, the controller (electric motor controller 8) of the vehicle drives the first electric motor 6a via the first inverter 5a and raises the rotation speed of the first electric motor 6a from S2 to S1. At this time, the first electric motor 6a needs to output such a large torque as to produce a large rotation speed difference that includes the reverse from the negative rotation to the positive rotation. Therefore, at this time, the first inverter 5a and the first electric motor 6a rapidly produce heat.

In the cooling system of the hybrid vehicle 200 of the second embodiment, similar to the cooling system of the first embodiment, if the main switch 14 is switched from the ON position to the OFF position while the vehicle is travelling, the bypass coolant passages that bypass the inverter and the electric motor are selected, or made effective, so that the coolant circulates through the bypass passages. In this manner, the temperature of the coolant accordingly is lowered. After that, when the main switch 14 is switched from the OFF position to the ON position, the hybrid vehicle 200 experiences rapid heat production from the first inverter 5a and the first electric motor 6a as described above. At this time, since the coolant temperature is very low, the coolant absorbs heat from the first inverter 5a and the first electric motor 6a, restraining the temperature rise of those devices.

As described above, the technologies disclosed in this specification are effective particularly to the hybrid vehicles that have a power distribution mechanism as described above.

With regard to the technologies disclosed in the specification, several notes will be given below. As shown in conjunction with the second embodiment, the above-described control of the cooling system is effective particularly in the case where if the main switch is switched from the OFF position to the ON position while the vehicle is travelling, the first electric motor 6a is expected to undergo rotation speed changes that include the reverse in rotation direction. Therefore, as an improvement in the technologies disclosed in the specification, a hybrid vehicle having the following construction is also preferable. The preferable hybrid vehicle includes an engine and two electric motors, and further includes a planetary gear-type power distribution mechanism described above. The control of the cooling system (the switching to the bypass coolant passage) is carried out only in the case where the first electric motor 6a is going to undergo a rotation speed change that includes the reverse in the rotation direction if the main switch is switched from the OFF state to the ON state while the vehicle is travelling. The "case where the first electric motor 6a is going to undergo a rotation speed change that includes the reverse in the rotation direction if the main switch is switched from the OFF position to the ON position while the vehicle is travelling" can also be alternatively expressed as a "case where if the main switch is switched from the ON position to the OFF position before being switched from the OFF position to the ON position, the rotation directions of the first electric motor 6a before and after the switching (before and after the main switch is switched from the ON position to the OFF position) are opposite to each other".

In each of the embodiments, the cooling system cools the two devices, that is, the inverter and the electric motor. As a modification of the embodiments, the cooling system may also be a system that cools one of the inverter and the electric motor.

Furthermore, in the foregoing embodiments, the bypass coolant passages 31a and 31b (see FIG. 2) bypass the inverter 5 and the electric motor 6a, respectively. As a modification of the embodiments, a construction may be employed, in which one or both of the inverter and the electric motor are selectively bypassed according to the situation. For example, when the actual temperature of the inverter is within a predetermined temperature range, the coolant passage is switched to the bypass coolant passage 31a (that bypasses the inverter). Likewise, when the actual temperature of the electric motor is within a predetermined temperature range, the coolant passage is switched to the bypass coolant passage 31b (that bypasses the electric motor). When the temperature of the inverter or the electric motor exceeds the predetermined temperature range, the switching to the bypass coolant passage is not carried out. That is, if the temperature of the inverter or the electric motor is high, the cooling of that device is given priority, and if the temperature of the device is within the predetermined temperature range, the cooling of the coolant itself is given priority rather than the cooling of the device in order to prepare for heat production that occurs later. Incidentally, the predetermined temperature range for the inverter and the predetermined temperature range for the electric motor may be different from each other.

Although specific embodiments of the invention have been described in detail above, these embodiments are merely illustrative, and the scope of the invention is not limited to these embodiments. The technologies described in the claims include various modifications and changes of the foregoing specific embodiments as well.

The controller may be configured so that while the bypass coolant passage is selected, the controller keeps, at a first rotation speed, the rotation speed of the radiator fan that cools the coolant when the vehicle speed is lower than or equal to a predetermined threshold value of the vehicle speed, and keeps the rotation speed of the radiator fan at a second rotation speed that is lower than the first rotation speed when the vehicle speed is higher than the threshold value. When the vehicle speed is high, the radiator receives strong air currents, and therefore there is no need for high-speed rotation of the radiator fan. The above-described controller restrains the electric power consumption in the cooling of the coolant in preparation for the switching off and on of the main switch while the vehicle is travelling.

The above-described measures for the switching off and on of the main switch while the vehicle is travelling is effective especially in the case of a hybrid vehicle that has an engine and two electric motors and also has a power distribution mechanism that has the following structure. The power distribution mechanism includes a planetary gear set whose gears have the following linkage structure. The planetary carrier is connected to the engine. One of the sun gear and the ring gear is connected to the first electric motor. The other of the sun gear and the ring gear is connected to the second electric motor, and is also connected to the axle shaft. In the planetary gear, when the carrier is in a stopped state, the sun gear and the ring gear rotate in directions opposite to each other. On the other hand, when the rotation speed ratio between the ring gear and the carrier is less than or equal to a predetermined rotation speed, the sun gear and the ring gear rotate in the same direction. In the above-described power distribution mechanism, when the engine (the carrier) is rotating, the ring gear and the sun gear rotate in the same direction, and when the engine stops, there occurs a situation in which the ring gear and the sun gear rotate in directions opposite to each other. Therefore, if the main switch is switched off and on while the vehicle is travelling, it is demanded that the first electric motor that functions as a self-starter motor produce such a torque as to bring about a rotation speed difference that includes the reverse in the rotation direction, in order to re-start the engine, which has been in a stopped state. Therefore, a large amount of electric current flows via the inverter and the electric motor, so that heat is rapidly produced. The technologies shown by the specification that restrain the temperature rise of the inverter (electric motor) caused by the heat production from the inverter when the main switch is turned off and or while the vehicle is travelling, are effective especially in the case of a hybrid vehicle that has the above power distribution mechanism.

What is claimed is:

1. An electric vehicle comprising:
    an electric motor for driving a wheel;
    an inverter that supplies electric power to the electric motor; and
    a cooling system that cools at least one of the electric motor and the inverter, the cooling system including:
        a main coolant passage configured to circulate a coolant through a radiator and at least one of the electric motor and the inverter;
        a bypass coolant passage that is connected to the main coolant passage and that bypasses at least one of the electric motor and the inverter; and
        a controller configured to switch from the main coolant passage to the bypass coolant passage when an ignition switch of the vehicle, that is provided at a driver's seat, is switched from an on-state to an off-state while the electric vehicle is travelling, and to switch from the bypass coolant passage to the main coolant passage when the ignition switch is switched back to the on-state.

2. The electric vehicle according to claim 1, wherein
    the controller is configured so that while the bypass coolant passage is selected, the controller keeps, at a first rotation speed, rotation speed of a radiator fan that cools the coolant when vehicle speed is less than or equal to a predetermined threshold vehicle speed value, and keeps the rotation speed of the radiator fan at a second rotation speed that is lower than the first rotation speed when the vehicle speed is higher than the threshold vehicle speed value.

3. The electric vehicle according to claim 1, further comprising
    a power distribution mechanism that includes a planetary carrier connected to an engine, a sun gear and a ring gear, wherein:
    one of the sun gear and the ring gear is connected to a first electric motor;
    the other of the sun gear and the ring gear is connected to a second electric motor, and is connected to an axle shaft; and
    the power distribution mechanism is configured so that rotation direction of the first electric motor when the engine is rotating and the rotation direction of the first electric motor when the engine is in a stopped state are opposite to each other.

4. The electric vehicle according to claim 1, further comprising
    a pump for circulating the coolant, wherein
    the controller is configured to continue driving the pump even when the ignition switch is switched from the on-state to the off-state while the electric vehicle is travelling.

5. The electric vehicle according to claim 1, wherein
    the bypass coolant passage includes a motor bypass coolant passage that bypasses the motor, and
    the controller is configured not to perform switching from the main coolant passage to the motor bypass coolant passage when a temperature of the motor is higher than a predetermined temperature range.

6. The electric vehicle according to claim 1, wherein
    the bypass coolant passage includes an inverter bypass coolant passage that bypasses the inverter, and
    the controller is configured not to perform switching from the main coolant passage to the inverter bypass coolant passage when a temperature of the inverter is higher than a predetermined temperature range.

* * * * *